UNITED STATES PATENT OFFICE.

ALBERT L. MURDOCK, OF BOSTON, MASSACHUSETTS.

IMPROVEMENT IN PROCESSES OF MANUFACTURING CORN-FLOUR.

Specification forming part of Letters Patent No. 192,525, dated June 26, 1877; application filed January 27, 1877.

*To all whom it may concern:*

Be it known that I, ALBERT L. MURDOCK, of Boston, in the county of Suffolk, State of Massachusetts, have invented a new and useful process of compounding certain properties extracted from the grains of certain cereals to produce a flour which shall be equal to that made from wheat in flavor and nutritious qualities, and at less cost, of which the following is a specification:

My invention consists, essentially, of the following steps: I first take Indian corn, and, by running it through a hominy-mill, or other analogous mill, remove the hull or shell and the chits and germs, and also a portion of the starch and fibrous matter from the kernels. It is essential that the process be performed in this manner instead of with the aid of water or steam, which, while softening and removing the hull, would also dissolve a portion of the oil, sugar, and starch, and is also liable to impair the quality and flavor of the grain, which are elements essential to my compound flour, known as "Golden Corn Flour." I then separate all the hulls and chits from the decorticated and cleaned kernels by air-blast and coarse bolts, and grind said kernels in a wheat or corn mill, and, by afterward using different grades of bolting-machines or attachments, to more completely remove the impurities mentioned. I then separate from the ground corn, which has been reduced to a fine grain, what is sharp and angular, the fine flour being adapted, when demanded, to make a different grade of flour adapted for special uses, such as pastry, &c., and known as "grades." I then take wheat, oats, and barley, separately or together, and grind them to a flour, from which I extract the hulls, woody matter, and a portion of the gluten and starch, they being useless for my process, and retain the balance, which I compound with the extracts from the corn.

The proportions in which the ingredients are compounded vary somewhat with the different varieties of the cereals that I may use, said varities having different proportions of the elements of gluten, oil, sugar, starch, &c.; but it may be stated, in a general way, that in some cases a given proportion of wheat, (equal in quality and properties to Massachusetts wheat,) equal to one-third, and two-thirds of the corn extracts from corn, (equal to the best Massachusetts corn in quality and nutritious properties,) will make a flour up to my standard, while in other cases the necessary proportions vary somewhat, and are to be determined by experience and judgment, the essential idea of my invention lying in the admixture with the corn-flour prepared, as above stated, with the properties I extract from the wheat, oats, and barley, from which all the bran, fuzz, and fibrous matter have been removed.

When I use white corn to produce silver-corn flour, the corn is prepared in the same manner as when I use yellow corn, which latter corn furnishes the extract which I compound into my golden-corn flour, and the fine flour of both cannot be obtained in equal perfection from the grains treated in any other known manner; nor can a flour be made so rich and nutritious, as well as low in price, by any other known process, from corn compounded with wheat, oats, and barley, separated or together.

I claim as my invention—

1. The within-described process of making flour from maize or Indian corn, consisting, essentially, of the following steps, viz., hulling the corn in a hominy or other suitable machine, separating the hulls and germs from the decorticated kernels, grinding the said kernels, and bolting the ground products down to a grain or flour free from all fibrous and other impurities, adding to the corn-flour thus obtained the glutinous, sugary, starchy, and other food properties obtained from wheat or other grains rich in said properties, substantially as set forth.

2. As a new article of manufacture, the compound flour obtained by the process within described.

ALBERT L. MURDOCK.

Witnesses:
   GEO. G. SMITH,
   J. S. KIDDER.